United States Patent
Piferi

(10) Patent No.: US 12,551,685 B2
(45) Date of Patent: Feb. 17, 2026

(54) PARTIALLY-DEFORMABLE IMPELLER AND CATHETER BLOOD PUMP INCORPORATING SAME

(71) Applicant: FBR Medical, Inc., Westport, CT (US)

(72) Inventor: Peter G. Piferi, Orange, CA (US)

(73) Assignee: FBR Medical, Inc., El Dorado Hills, CA (US)

( * ) Notice: Subject to any disclaimer, the term of this patent is extended or adjusted under 35 U.S.C. 154(b) by 757 days.

(21) Appl. No.: 17/858,615

(22) Filed: Jul. 6, 2022

(65) Prior Publication Data

US 2023/0008168 A1 Jan. 12, 2023

Related U.S. Application Data

(60) Provisional application No. 63/219,257, filed on Jul. 7, 2021.

(51) Int. Cl.
*A61M 60/178* (2021.01)
*A61M 60/157* (2021.01)
*A61M 60/216* (2021.01)

(52) U.S. Cl.
CPC ........ *A61M 60/178* (2021.01); *A61M 60/157* (2021.01); *A61M 60/216* (2021.01); *A61M 2205/0216* (2013.01)

(58) Field of Classification Search
CPC .................................................. A61M 60/808
See application file for complete search history.

(56) References Cited

U.S. PATENT DOCUMENTS

| | | | |
|---|---|---|---|
| 3,510,229 A | 5/1970 | Smith | |
| 4,187,879 A | 2/1980 | Fermer et al. | |
| 4,625,712 A | 12/1986 | Wampler | |
| 4,753,221 A | 6/1988 | Kensey et al. | |
| 4,817,586 A | 4/1989 | Wampler | |
| 4,846,152 A | 7/1989 | Wampler et al. | |
| 4,919,647 A | 4/1990 | Nash | |
| 4,969,865 A | 11/1990 | Hwang et al. | |
| 5,092,844 A | 3/1992 | Schwartz et al. | |
| 5,112,292 A | 5/1992 | Hwang et al. | |
| 5,163,910 A | 11/1992 | Schwartz et al. | |
| 5,169,378 A | 12/1992 | Figuera | |
| 5,376,114 A | 12/1994 | Jarvik | |

(Continued)

FOREIGN PATENT DOCUMENTS

| | | |
|---|---|---|
| CN | 111773460 A | 10/2020 |
| CN | 111840681 A | 10/2020 |

(Continued)

OTHER PUBLICATIONS

International Search Report and the Written Opinion of the International Searching Authority corresponding to International Patent Application No. PCT/US2022/036235 (12 pages) (mailed Oct. 25, 2022).

(Continued)

*Primary Examiner* — George R Evanisko
(74) *Attorney, Agent, or Firm* — Myers Bigel, P.A.

(57) ABSTRACT

A partially deformable impeller has at least two blades, wherein a periphery of each blade is deformable, the periphery being an outermost 5 to 20 percent of a width of the blade. In some embodiments, a catheter blood pump incorporates the partially deformable impeller.

2 Claims, 8 Drawing Sheets

(56) References Cited

U.S. PATENT DOCUMENTS

| | | |
|---|---|---|
| 5,405,383 A | 4/1995 | Barr |
| 5,588,812 A | 12/1996 | Taylor et al. |
| 5,749,855 A | 5/1998 | Reitan |
| 5,755,784 A | 5/1998 | Jarvik |
| 5,776,190 A | 7/1998 | Jarvik |
| 5,888,241 A | 3/1999 | Jarvik |
| 5,911,685 A | 6/1999 | Siess et al. |
| 6,007,478 A | 12/1999 | Siess et al. |
| 6,053,907 A | 4/2000 | Zirps |
| 6,058,593 A | 5/2000 | Siess |
| 6,076,958 A | 6/2000 | Althouse et al. |
| 6,135,943 A | 10/2000 | Yu et al. |
| 6,139,487 A | 10/2000 | Siess |
| 6,176,822 B1 | 1/2001 | Nix et al. |
| 6,176,848 B1 | 1/2001 | Rau et al. |
| 6,200,260 B1 | 3/2001 | Bolling |
| 6,227,820 B1 | 5/2001 | Jarvik |
| 6,245,007 B1 | 6/2001 | Bedingham et al. |
| 6,295,877 B1 | 10/2001 | Aboul-Hosn et al. |
| 6,299,575 B1 | 10/2001 | Bolling |
| 6,327,994 B1 | 12/2001 | Labrador |
| 6,387,037 B1 | 5/2002 | Bolling et al. |
| 6,390,969 B1 | 5/2002 | Bolling et al. |
| 6,406,422 B1 | 6/2002 | Landesberg |
| 6,428,464 B1 | 8/2002 | Bolling |
| 6,497,698 B1 | 12/2002 | Fonger et al. |
| 6,508,787 B2 | 1/2003 | Erbel et al. |
| 6,527,699 B1 | 3/2003 | Goldowsky |
| 6,533,716 B1 * | 3/2003 | Schmitz-Rode .... A61M 60/139 600/16 |
| 6,544,216 B1 | 4/2003 | Sammler et al. |
| 6,620,004 B1 | 9/2003 | Piper |
| 6,623,475 B1 | 9/2003 | Siess |
| 6,644,125 B1 | 11/2003 | Siess et al. |
| 6,685,621 B2 | 2/2004 | Bolling et al. |
| 6,685,696 B2 | 2/2004 | Fleischhacker et al. |
| 6,716,157 B2 | 4/2004 | Goldowsky |
| 6,719,720 B1 | 4/2004 | Voelker et al. |
| 6,790,171 B1 | 9/2004 | Gruendeman et al. |
| 6,794,789 B2 | 9/2004 | Siess et al. |
| 6,808,483 B1 | 10/2004 | Ortiz et al. |
| 6,889,082 B2 | 5/2005 | Bolling et al. |
| 6,942,611 B2 | 9/2005 | Siess |
| 6,981,942 B2 | 1/2006 | Khaw et al. |
| 7,010,954 B2 | 3/2006 | Siess et al. |
| 7,011,620 B1 | 3/2006 | Siess |
| 7,022,100 B1 | 4/2006 | Aboul-Hosn et al. |
| 7,027,875 B2 | 4/2006 | Siess et al. |
| 7,070,555 B2 | 7/2006 | Siess |
| RE39,217 E | 8/2006 | Rockwood |
| 7,241,257 B1 | 7/2007 | Ainsworth et al. |
| 7,258,679 B2 | 8/2007 | Moore et al. |
| 7,371,210 B2 | 5/2008 | Brock et al. |
| 7,393,181 B2 * | 7/2008 | McBride ............... F04D 29/526 416/240 |
| 7,828,710 B2 | 11/2010 | Shifflette |
| 8,037,713 B2 | 10/2011 | Haley et al. |
| 8,079,948 B2 | 12/2011 | Shifflette |
| 8,177,703 B2 | 5/2012 | Smith et al. |
| 8,252,014 B2 | 8/2012 | Fisher |
| 8,298,169 B2 | 10/2012 | Yacoubian et al. |
| 8,485,961 B2 | 7/2013 | Campbell et al. |
| 8,579,858 B2 | 11/2013 | Reitan et al. |
| 8,591,170 B1 | 11/2013 | Rawls |
| 8,591,393 B2 | 11/2013 | Walters et al. |
| 8,597,170 B2 | 12/2013 | Walters et al. |
| 8,617,239 B2 | 12/2013 | Reitan |
| 8,684,904 B2 | 4/2014 | Campbell et al. |
| 8,721,517 B2 * | 5/2014 | Zeng ..................... A61M 60/13 600/19 |
| 8,777,832 B1 | 7/2014 | Wang et al. |
| 8,795,576 B2 | 8/2014 | Tao et al. |
| 8,814,776 B2 | 8/2014 | Hastie et al. |
| 8,849,398 B2 | 9/2014 | Evans |
| 8,926,492 B2 | 1/2015 | Scheckel |
| 9,028,392 B2 | 5/2015 | Shifflette |
| 9,089,634 B2 | 7/2015 | Schumacher et al. |
| 9,278,189 B2 | 3/2016 | Corbett |
| 9,402,942 B2 | 8/2016 | Hastie et al. |
| 9,433,713 B2 | 9/2016 | Corbett et al. |
| 9,446,179 B2 | 9/2016 | Keenan et al. |
| 9,474,840 B2 | 10/2016 | Siess |
| 9,572,915 B2 | 2/2017 | Heuring et al. |
| 9,669,142 B2 | 6/2017 | Spanier et al. |
| 9,669,144 B2 | 6/2017 | Spanier et al. |
| 9,717,833 B2 | 8/2017 | Mcbride et al. |
| 9,750,861 B2 | 9/2017 | Hastie et al. |
| 9,770,543 B2 | 9/2017 | Tanner et al. |
| 9,814,814 B2 | 11/2017 | Corbett et al. |
| 9,821,100 B2 | 11/2017 | Corbett et al. |
| 9,833,550 B2 | 12/2017 | Siess |
| 9,872,947 B2 | 1/2018 | Keenan et al. |
| 9,872,948 B2 | 1/2018 | Siess |
| 9,878,079 B2 | 1/2018 | Pfeffer et al. |
| 9,895,475 B2 | 2/2018 | Toellner et al. |
| 9,907,890 B2 | 3/2018 | Muller |
| 9,962,475 B2 | 5/2018 | Campbell et al. |
| 9,999,714 B2 | 6/2018 | Spanier et al. |
| 10,018,096 B2 | 7/2018 | Wallimann et al. |
| 10,029,037 B2 | 7/2018 | Muller et al. |
| 10,201,645 B2 | 2/2019 | Muller |
| 10,342,906 B2 | 7/2019 | D'Ambrosio et al. |
| 10,617,808 B2 | 4/2020 | Hastie et al. |
| 10,668,195 B2 | 6/2020 | Flores |
| 10,737,008 B2 | 8/2020 | Corbett et al. |
| 10,808,704 B2 | 10/2020 | Siess et al. |
| 10,905,808 B2 | 2/2021 | Tuval et al. |
| 11,160,970 B2 | 11/2021 | Muller et al. |
| 11,298,524 B2 | 4/2022 | El Katerji et al. |
| 11,305,105 B2 | 4/2022 | Corbett et al. |
| 11,491,322 B2 | 11/2022 | Muller et al. |
| 2002/0150463 A1 | 10/2002 | Deblanc et al. |
| 2003/0105383 A1 | 6/2003 | Barbut et al. |
| 2003/0135086 A1 | 7/2003 | Khaw et al. |
| 2003/0163019 A1 | 8/2003 | Goldowsky |
| 2004/0241019 A1 | 12/2004 | Goldowsky |
| 2005/0049696 A1 | 3/2005 | Siess et al. |
| 2006/0008349 A1 | 1/2006 | Khaw |
| 2006/0062672 A1 | 3/2006 | McBride et al. |
| 2006/0155158 A1 | 7/2006 | Aboul-Hosn |
| 2008/0103591 A1 | 5/2008 | Siess |
| 2008/0114339 A1 | 5/2008 | McBride et al. |
| 2009/0069854 A1 | 3/2009 | Keidar et al. |
| 2012/0059460 A1 | 3/2012 | Reitan |
| 2012/0178986 A1 | 7/2012 | Campbell et al. |
| 2013/0053623 A1 | 2/2013 | Evans et al. |
| 2014/0275726 A1 | 9/2014 | Zeng |
| 2015/0247503 A1 | 9/2015 | Seiss et al. |
| 2015/0290372 A1 | 10/2015 | Muller et al. |
| 2015/0297812 A1 | 10/2015 | Miyakoshi et al. |
| 2015/0306291 A1 | 10/2015 | Bonde et al. |
| 2017/0072120 A1 | 3/2017 | Tanner et al. |
| 2018/0055979 A1 | 3/2018 | Corbett et al. |
| 2018/0110908 A1 | 4/2018 | Larose |
| 2018/0169312 A1 | 6/2018 | Barry |
| 2019/0046703 A1 | 2/2019 | Shambaugh et al. |
| 2019/0083690 A1 | 3/2019 | Siess et al. |
| 2019/0269840 A1 | 9/2019 | Tuval et al. |
| 2019/0321529 A1 | 10/2019 | Korakianitis et al. |
| 2019/0365973 A1 | 12/2019 | Flores |
| 2020/0268952 A1 | 8/2020 | Nitzan et al. |
| 2020/0405926 A1 | 12/2020 | Alexander et al. |
| 2021/0008261 A1 * | 1/2021 | Calomeni ........... A61M 60/139 |
| 2021/0052795 A1 | 2/2021 | Roehn et al. |
| 2021/0162196 A1 | 6/2021 | Georges et al. |
| 2021/0170081 A1 | 6/2021 | Kanz |
| 2021/0187274 A1 | 6/2021 | Malkin et al. |
| 2021/0196941 A1 | 7/2021 | Bernazani |
| 2021/0220634 A1 | 7/2021 | Cook |
| 2021/0260358 A1 | 8/2021 | Korakianitis et al. |
| 2021/0330958 A1 | 10/2021 | Stotz et al. |
| 2022/0184377 A1 | 6/2022 | Almedhychy et al. |
| 2022/0288381 A1 | 9/2022 | Siess et al. |
| 2022/0313980 A1 | 10/2022 | Hildebrand et al. |

(56) References Cited

U.S. PATENT DOCUMENTS

| | | |
|---|---|---|
| 2022/0347458 A1 | 11/2022 | Spanier |
| 2023/0049460 A1 | 2/2023 | Skrzypczak et al. |
| 2023/0063196 A1 | 3/2023 | Spanier et al. |
| 2023/0114252 A1 | 4/2023 | Butler |
| 2023/0132235 A1 | 4/2023 | Butler et al. |
| 2023/0144756 A1 | 5/2023 | Ship |
| 2023/0149699 A1 | 5/2023 | Beekman et al. |

FOREIGN PATENT DOCUMENTS

| | | |
|---|---|---|
| CN | 212940997 U | 4/2021 |
| CN | 114602055 A | 6/2022 |
| WO | 9639956 A1 | 12/1996 |
| WO | 9853864 A1 | 12/1998 |
| WO | 0043053 A1 | 7/2000 |
| WO | 0117581 A2 | 3/2001 |
| WO | 0121249 A1 | 3/2001 |
| WO | 0139817 A2 | 6/2001 |
| WO | 0174419 A1 | 10/2001 |
| WO | 0241935 A1 | 5/2002 |
| WO | 0243791 A1 | 6/2002 |
| WO | 0245775 A2 | 6/2002 |
| WO | 03103745 A2 | 12/2003 |
| WO | 2006051023 A1 | 5/2006 |
| WO | 2007112033 A2 | 10/2007 |
| WO | 2011039091 A1 | 4/2011 |
| WO | 2017162618 A1 | 9/2017 |
| WO | 2018226991 A1 | 12/2018 |
| WO | 2021119478 A1 | 6/2021 |
| WO | 2021191106 A1 | 9/2021 |
| WO | 2022056542 A1 | 3/2022 |
| WO | 2022204400 A1 | 9/2022 |
| WO | 2023092122 A1 | 5/2023 |

OTHER PUBLICATIONS

Capoccia, Massimo "Mechanical Circulatory Support for Advanced Heart Failure: Are We about to Witness a New Gold Standard'?" Journal of Cardiovascular Development and Disease, 3(35):1-22 (2016).

Impella "Protected PCI with the Impella Heart Pump" Patient Brochure Guide https://www.abiomed.com/products-and-services/impella/impella-cp-with-smartassist (16 pages) (2023).

Mendes et al. "Two Years of Experience in the Implantation of Heartmate III" Rev Port Cir Cardiotorac Vasc, 24(3-4):120 (2017).

Pesarini et al. "Impella-protected PCI: the clinical results achieved so far" Minerva Cardioangiologica, 66(5):612-618 (2018).

Siegenthaler et al. "The Impella Recover microaxial left ventricular assist device reduces mortality for postcardiotomy failure: a three-center experience" J Thorac Cardiovasc Surg, 127(3):812-822 (2004).

\* cited by examiner

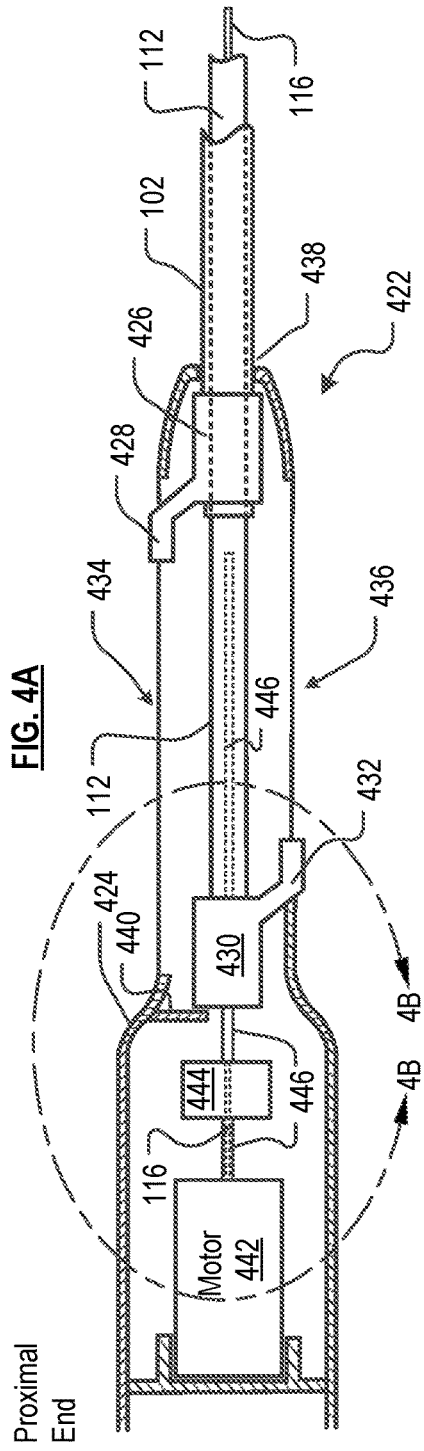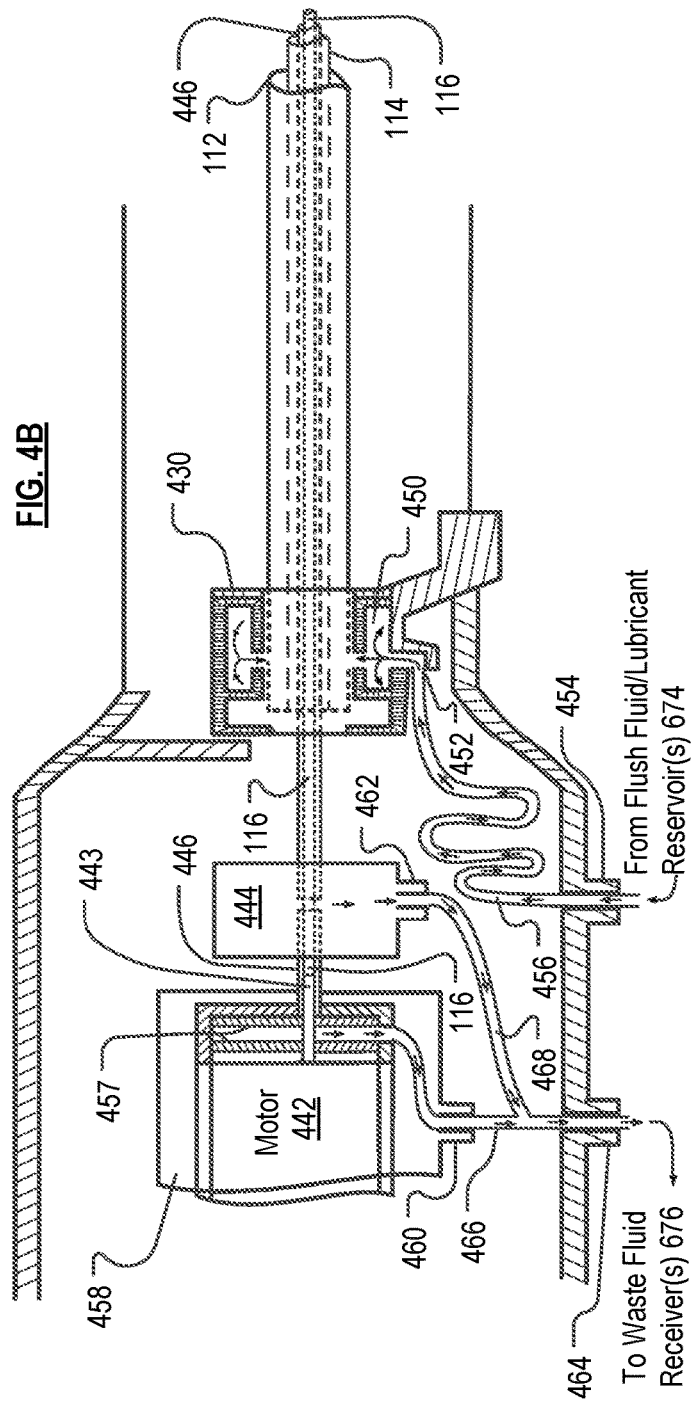

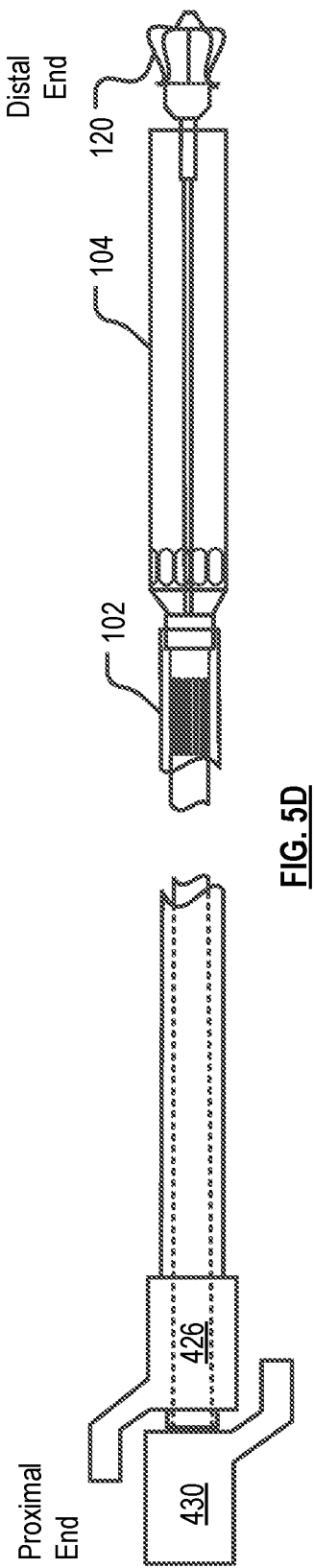
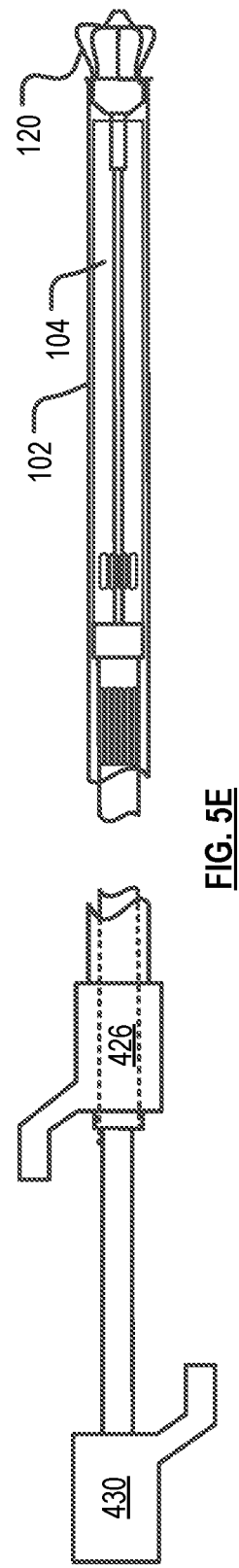
FIG. 5D
FIG. 5E

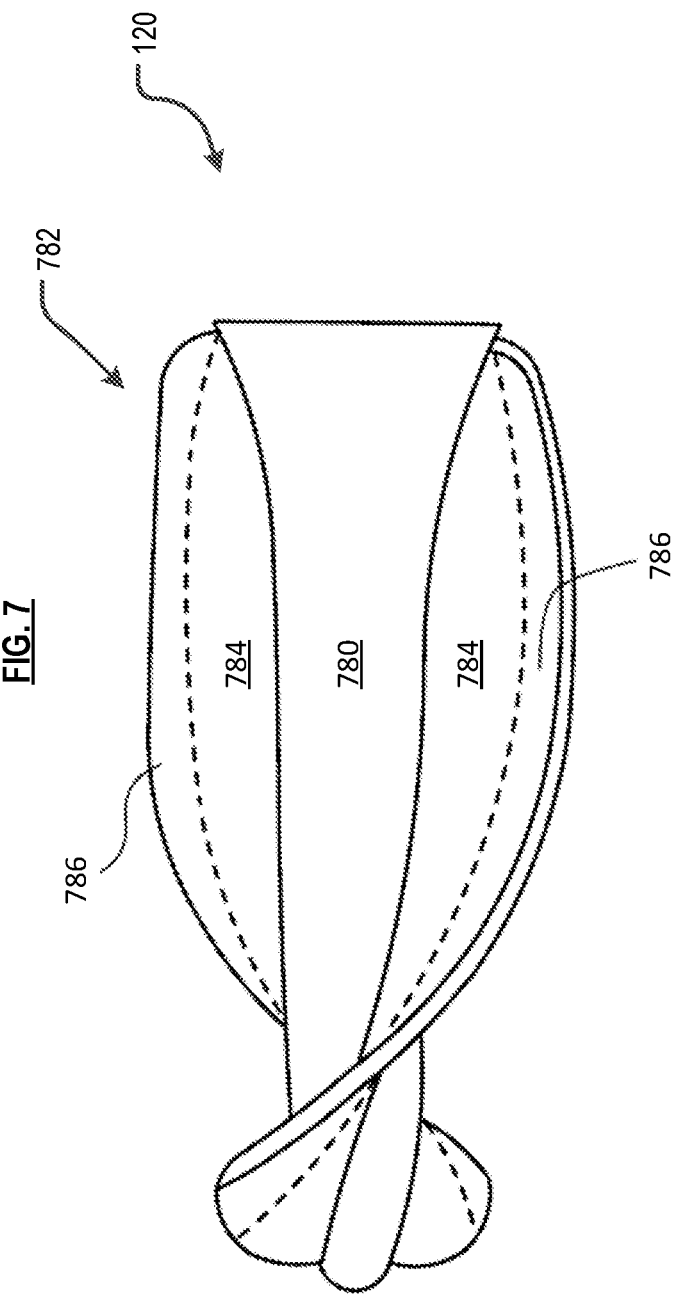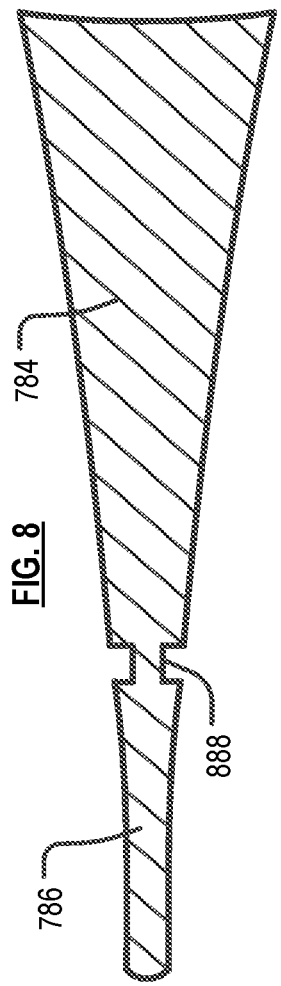

PARTIALLY-DEFORMABLE IMPELLER AND CATHETER BLOOD PUMP INCORPORATING SAME

STATEMENT OF RELATED CASES

This specification claims priority to U.S. Pat. App. No. 63/219,257 filed Jul. 7, 2021, which is incorporated herein by reference. This specification is also related to U.S. Pat. No. 10,668,195, incorporated by reference herein.

FIELD OF THE INVENTION

This invention relates generally to catheter pumps, and impellers for use therewith.

BACKGROUND OF THE INVENTION

Some patients who have heart failure, and some of those at risk for developing it, receive interventions intended to temporarily assist the heart before or during a medical or surgical procedure and/or during a recovery period. The intervention typically lasts for less than a week, but can continue for several weeks. These interventions include pharmaceuticals and/or medical devices, including cardiac-assist devices.

Some cardiac-assist devices include a pump to supplement the heart's pumping action. By assuming some of the heart's pumping function, these "blood pumps" unload the heart, helping it to recover. Cardiac-assist devices can be temporary or permanent.

Some blood pumps are percutaneous, wherein the impeller (and in some devices, the pump's motor as well) temporarily reside within the patient. These blood pumps are often coupled to a catheter, and are consequently referred to as "catheter blood pumps." Some catheter blood pumps are inserted into the patient using established cath-lab techniques, wherein they are advanced through the vascular system (typically entering through the femoral artery or the radial artery) to a patient's heart. This approach is significantly less invasive than cardiac surgery or other relatively complicated procedures.

Since catheter blood pumps are advanced to the heart through the vascular system, there is a limit as to the acceptable diameter of the largest feature of the catheter blood pump. In particular, it is desirable for a catheter blood pump to have as small a diameter as possible, preferably less than 16 Fr, and more preferably less than 12 Fr, to minimize trauma to the vasculature or trauma associated with the surgery performed for insertion. It is also desirable for such a pump to have a large pumping capacity, preferably 2 liters per minute or even more, to provide sufficient circulation for a patient. Additionally, such a pump must avoid, to the extent possible, damaging the blood in the form of hemolysis (i.e., destruction of red blood cells).

For a pump having a fixed-diameter, non-foldable/non-expandable impeller, an outermost tube, typically called a sheath, is usually the largest-diameter feature, whereas other elements of the blood pump (e.g., impeller housing, impeller, etc.) that are intended to be introduced into the vasculature are contained within the sheath. As a consequence, the diameter of the impeller is necessarily smaller than the sheath and smaller than the impeller housing. This typically results in an impeller having a diameter in the range of 9 to 12 Fr, which presents a significant limitation to generating pump flows greater than about 2 liters/minute.

In recognition of this problem, catheter blood pumps having an expandable impeller have been proposed. An expandable impeller collapses to a very small diameter (e.g., by folding/bending/hinging the impeller blades, etc.) to fit within a tube (e.g., sheath, etc.) for insertion into the body and delivery via the vasculature to the aorta or heart. Once the pump is positioned, the expandable impeller is freed from the confines of the tubing (e.g., such as by partially retracting the tubing, etc.) and then expands to a larger diameter that could not otherwise be accommodated by the patient's vasculature. Usually, the expandable impeller is accompanied by an expandable housing that is freed from the sheath/tubing at the same time as the expandable impeller, enabling both to expand in diameter.

This larger-diameter impeller develops, at least theoretically, a notably greater pumping capacity than would otherwise possible. However, expandable-impeller designs present significant implementation challenges, including the design of the impeller itself, as well as issues related to repeatedly and accurately controlling the gap between the rapidly rotating impeller blades and the surrounding impeller housing. Furthermore, experimentation and simulation (i.e., computational fluid dynamics) have shown that most proposed expandable impeller designs are relatively inefficient for generating blood flow as compared to what is achievable with some fixed-diameter impeller designs.

U.S. Pat. No. 10,668,195 (the '195 patent) discloses a percutaneous catheter blood pump that combines elements of an expandable catheter blood pump—namely an expandable impeller housing—with those of a non-expandable blood pump, such as a fixed-diameter impeller. The salient elements of that blood pump include a sheath, an expandable impeller housing, and a fixed-diameter impeller. In some embodiments, a drive cable, which is operatively coupled to an extracorporeal motor, conveys torque that drives the rotation of the impeller.

For the blood pump disclosed in the '195 patent, the diameter of the fixed-diameter impeller, rather than that of any structure that surrounds it (e.g., impeller housing, sheath, etc.), is the feature that bumps up against the limit imposed by the diameter of the vasculature. In such embodiments, the diameter of the fixed-diameter impeller is at least as large as the outer diameter of any other feature of the catheter blood pump that enters the body. Simply put, for a catheter blood pump having a fixed-diameter impeller, the designs disclosed by the '195 patent maximize the impeller's diameter.

Because the impeller of the blood pump disclosed in the '195 patent has a fixed diameter and therefore does not expand, it is designed based on hemodynamic and pumping-efficiency considerations, and without regard to the implementation details of an expandable impeller. This results in a more efficient impeller design. Additionally, as a consequence of its relatively large size (c.a., fixed-blade circle diameter in the range of about 14 Fr to about 16 Fr), as compared to other fixed-diameter impellers, the fixed-diameter impeller of the '195 patent can be rotated at a relatively lower rotational speed for generating a given amount of pump flow than fixed-diameter impellers used in existing catheter blood pumps. This decreased rotational speed results in reduced shear stress, and, hence, decreased hemolysis of the patient's blood.

SUMMARY OF THE INVENTION

Some embodiments of the present invention provide a partially deformable impeller, and some other embodiments provide a catheter-blood pump incorporating such a partially deformable impeller. In some embodiments disclosed herein, the partially deformable impeller is used in conjunction with the catheter-blood pump disclosed in the '195 patent.

There is a possibility that the exposed, fixed-diameter impeller of the blood pump disclosed in the '195 patent might cause trauma to the vasculature during insertion or removal of that pump. In accordance with the present teachings, an impeller for use with a catheter blood pump, such as the blood pump of the '195 patent, has impeller blades that are partially deformable. Specifically, an outermost portion of the impeller blades—about 5% to about 20% of the width of the blades—are deformable. This results in an impeller that is more atraumatic than a fixed-diameter impeller.

Deformation of a partially deformable impeller in accordance with the present teachings occurs, for example, if the impeller enters a vessel having an inner diameter that is less than the nominal (undeformed) diameter of the impeller. Deformation might also occur as the impeller blade traverses a small-radius bend in a vessel, such as the aortic arch. Of course, in the case of blood-pumps having conventional expandable impellers, a sheath normally causes (full) deformation of the impeller. But when used in conjunction with the catheter blood pump like that disclosed in the '195 patent, it is only the patient's anatomy that causes (partial) deformation of the impeller.

Assuming that the impeller includes two diametrically opposed blades, overall impeller diameter can be reduced by a maximum of about 40% (both blades maximally deformed) in some embodiments. It is notable that as a function of vessel size, or when traversing a small-radius bend, only one of the impeller blades might deform.

Partially deformable impeller blades in accordance with the present teachings can be fabricated via: (1) varying materials composition of the impeller blades, (2) varying blade thickness, (3) physical design considerations, or any combinations thereof.

Since a partially deformable impeller in accordance with the present invention is minimally deformable, the compromises normally inherent in expandable impeller designs (which typically expand an amount in the range of about 300% to 500%) are not present. Thus, as with the blood pump having the fixed-diameter impeller disclosed in the '195 patent, the partially deformable impellers disclosed herein can be designed with a focus on hemodynamic and pumping-efficiency considerations.

Moreover, due to its deformability, a partially deformable impeller in accordance with the present teachings can be slightly larger than, for example, the fixed-diameter impeller disclosed in the '195 patent.

As previously noted, some prior-art catheter blood pumps include expandable impellers. Those blood pumps are inserted into the vascular system with the impeller in a highly collapsed/compressed state, wherein the blades are constrained within a shroud. When such pumps are advanced to their operational position in the anatomy, the shroud is partially withdrawn, freeing the impeller and permitting it to expand to several times its collapsed size. The present partially deformable impeller operates differently. It is deformed, as necessary, by a patient's anatomy, and is likely to cycle between a deformed and undeformed state as the catheter blood pump is advanced through the vascular system. Thus, rather than expanding when it reaches an operational position like prior-art expandable pumps, the partially deformable impeller deforms as required as it is advanced through the vascular system.

BRIEF DESCRIPTION OF THE DRAWINGS

To facilitate readability, features are not necessarily drawn to scale due to the wide range in features sizes of the catheter blood pump. Furthermore, internal views are likely to show some, but not all features, in cross section, as appropriate for best conveying the features relevant to the accompanying description. For the same reason, not all internal features are represented by "dashed" lines, as is conventional.

FIG. 4A depicts a handle containing an actuator for conducting some of the operations of the method of FIG. 3.

FIG. 4B depicts further detail of a portion of the handle of FIG. 4A.

FIG. 5D depicts the proximal and distal ends of catheter blood pump of FIG. 1A in an intermediate configuration, as it is being reconfigured for withdrawal from the vascular system.

FIG. 5E depicts the proximal and distal ends of catheter blood pump of FIG. 1A, as configured for withdrawal from the vascular system.

FIG. 7 depicts a partially deformable impeller in accordance with an illustrative embodiment of the present invention.

FIG. 8 depicts a side, cross-sectional view of a blade of the partially deformable impeller of FIG. 7.

DETAILED DESCRIPTION

Figure 1A:
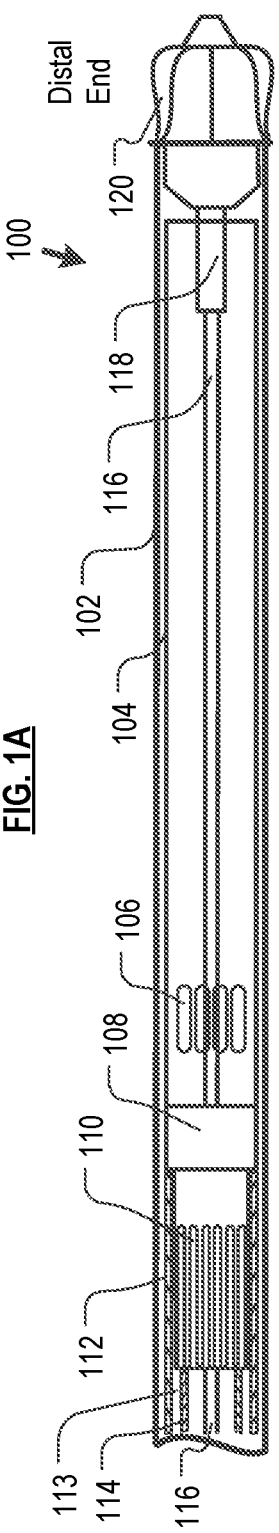
FIG. 1A depicts a distal portion of a catheter blood pump in accordance with the illustrative embodiment of the invention.

Definitions. The following words are defined for use in conjunction with this specification, including the appended claims.

"About" or "Substantially" means+/−15% of a nominal figure.

"Axial," when referring to the orientation of a device or feature, references a direction that is parallel to the orientation of the drive cable at the location at which the device/feature is present (along the drive cable).

"Catheter" or "Catheter assembly," as these terms are used in the blood-pump art and herein, refer en-masse to the plurality of tubes that form part of the catheter blood pump.

"Distal" and "Proximal." In the context of the catheter blood pump described herein, "distal" means relatively further from a first end of a drive cable that connects a drive motor to an impeller. The drive motor is located at the proximal end of the drive cable and the impeller is disposed at the distal end of the drive cable. Reference to the "distal" end of a particular feature of the catheter blood pump (e.g., an impeller housing, a bearing, etc.) means the end that is relatively further advanced in the vasculature (or relatively closer to distal end of the drive cable). Conversely, reference to the "proximal" end of a particular feature of the catheter blood pump means the end that is relatively closer to the proximal end of the drive cable.

"Blade circle." This term refers to the "circle" delimited by the perimeter of rotating impeller blades.

"Operatively coupled" means that the operation of one device affects another device. For example, if a drive cable is "operatively coupled" to an impeller, it is capable of driving the impeller (i.e., causing the impeller to rotate). Operatively coupled devices need not be directly physically coupled to one another (i.e., there can be intermediate linkages, such as other devices, tubes, fluids, etc., between operatively coupled devices.

"Proximate" means "near to."

Other definitions may be provided in context elsewhere in this disclosure.

The illustrative embodiment of the present invention is an apparatus comprising a partially deformable impeller. In this context, "partially deformable" refers to an impeller wherein the periphery of the blades—the outermost portion of the blades—is deformable. For use herein and the appended claims, the term "periphery," or "peripheral region," or "deformable portion" when referring to impeller blades, means the outermost about 5 percent to about 20 percent of the width of the blade. Thus, the deformable portion can be a minimum of about 5 percent of the width of an individual blade, up to a maximum of about 20 percent of the width of an individual blade.

In some embodiments, the apparatus is a catheter blood pump, such as the catheter blood pump disclosed in the '195 patent. The catheter blood pump is a percutaneous device; a portion of it remains outside of a patient's body (extracorporeal) and a portion is inserted into the patient (in-vivo) and advanced to the heart or proximate thereto. In particular, and among other elements, the blood pump's impeller and impeller housing are inserted into the patient.

Partially Deformable Impeller. FIG. 7 depicts partially deformable impeller ("PDI") 120. PDI 120 includes hub 780 and blades 782. Each blade includes substantially non-deformable portion 784 and peripheral region/deformable portion/periphery 786. The partially deformable impeller disclosed herein can be fabricated using at least one of the following techniques.

Deformability via materials selection. In some embodiments, the durometer of blades 782 decreases from a relatively higher durometer proximate to hub 780 to a relatively lower durometer nearer periphery 786. The "Shore A" Hardness Scale measures the hardness of flexible mold rubbers that range in hardness from very soft and flexible, to medium and somewhat flexible, to hard with almost no flexibility at all. Semi-rigid plastics can also be measured on the high end of the Shore A Scale. The "Shore D" Hardness Scale measures the hardness of hard rubbers, semi-rigid plastics and hard plastics. By way of example, a solid rubber pencil eraser has a Shore A hardness of about 40 (40A) and the heel of a shoe has a Shore A hardness of about 80 (80A). The heel of a shoe has a Shore D hardness of about 30 (30 D) and a shopping-cart wheel has a Shore D hardness of about 50 (50 D).

In some embodiments of PDI 120, the portion of blades 782 nearest hub 780 has a hardness in the range of about 70 D to about 85 D, and peripheral region 786 (i.e., near the tip of blades 782) has a hardness in the range of about 35 A to about 45 A. It is within the capabilities of those skilled in the art, in conjunction with this disclosure, to select an appropriate durometer for peripheral region 786, for non-deformable portion 784, and for hub 780.

In some embodiments, a single material produced at different durometers is used to gradually transition from a stiff hub 780 to a deformable blade periphery 786.

In some embodiments, a mix of materials in combination can suitably be used, such as, without limitation, PEEK (polyether ether ketone), acetal delrin, and PEBAX® (available from Arkema). For example, in some such embodiments, at least two of the aforementioned materials are used to form blades 782, with hardness appropriately transitioning from a relative maximum nearest hub 780 to a relative minimum nearest the tip of blades 782. This can be accomplished via varying the relative concentrations of the materials (each formed with a different durometer) to achieve the desired durometer. In some other embodiments, the relative concentrations of the materials remain relatively constant, but the materials are simply formed to exhibit a different durometer.

In some other embodiments, multiple materials can be used to create a transition in durometer. For example, in some embodiments, the materials used to form blades 782 vary as a function of radial location (e.g., a first material is used to fabricate hub 780 and non-deformable portion 784, and a second material is used to form deformable portion 786). Or more generally, a first material is used relatively closer to hub 780, and a second material is used in deformable portion 786 of blades 782. In some of such embodiments, in addition to transitioning between materials, hardness of a given material varies with increasing radial distance from hub 780. It is within the capabilities of those skilled in the art, in conjunction with this disclosure, to select appropriate materials for the fabrication of deformable portion 786, non-deformable portion 784, and for hub 780.

In some embodiments, a fiber composite material is used to fabricate the impeller. In such embodiments, the fiber volume fraction (the volume of fiber in a resin matrix) is varied, wherein the fiber volume fraction (FVF) decreases near the periphery of the impeller blades. This results in a relatively lower modulus of elasticity at the periphery of the impeller blades as compared to the portion of the impeller blades nearer to the impeller hub. The higher the elastic modulus, the more resistant the composite material is to deformation. For example, a doubling of fiber volume fraction can result in a doubling of the modulus, depending on other factors.

Alternatively, the length and/or orientation of fibers can be selected to vary the stiffness of portions of impeller blades 782. For example, relatively longer fibers impart greater stiffness to a composite material. And orienting the fibers within non-deformable portion 784 so that they align with the length of that portion, and orienting the fibers within deformable portion 786 radially (i.e., perpendicular to those in non-deformable portion 784) will impart relatively greater stiffness in non-deformable portion 784 than in deformable portion 786. Thus, the desired attributes of impeller blades 782 can be imparted by positioning relatively longer fibers in non-deformable portion 784 to align with the length of impeller blades 782, and positioning relatively shorter fibers in deformable portion 786 aligned radially.

In addition, or alternatively, a different type of fiber can be used in deformable portion 786 and non-deformable portion 784. For example, carbon fiber is considerably less flexible than glass fiber. Consequently, in some embodiments, carbon fiber is used in non-deformable portion 784 and glass fiber is used in deformable portion 786. Moreover, for fiber composites, the resin may be varied, such that a different resin (having a different modulus of elasticity) is used in these two portions of impeller blade 782 (as long as the resins are compatible with one another). It is within the capabilities of those skilled in the art, in conjunction with this disclosure, to design and fabricate a PDI with the desired attributes from composite materials, based on the aforementioned considerations involving FVF, fiber length, fiber alignment, fiber type, resin type, etc.

Deformability via blade thickness. In some embodiments, such as depicted in FIG. 8 showing a portion of one of impeller blades 782, the thickness of the blade is varied. In particular, blades 782 are relatively thinner at periphery 786 and relatively thicker in substantially non-deformable portion 784, with thickness gradually increasing toward hub 780. In some embodiments, the transition is not gradual, but rather more of a "step" change.

Deformability via structural design. In some embodiments, the impeller blades include a "passive" or "living" hinge 888, such as depicted in FIG. 8. This can be implemented, for example, as a relatively thin section of material oriented parallel and adjacent to the periphery of the impeller blade, or with an inward curvature (curving towards the impeller hub). In both such embodiments, rotational forces deform the periphery of the impeller blades into an efficient impeller design.

In some other embodiments, any combination of the materials selection, blade thickness, or structural design can be used to provide a partially deformable impeller in accordance with the present teachings. Selection of materials, durometer, blade thickness, and/or structural design to provide a partially deformable impeller, is within the capabilities of those skilled in the art, in view of the present disclosure.

In some embodiments, PDI 120 is designed to accept a guide wire, such as by creating a channel at its tip, to allow for rapid-exchange guide wire.

In some embodiments, a PDI in accordance with the present teachings has a nominal (undeformed) diameter in the range of 14 Fr (4.7 mm) to 16 Fr (5.3 mm).

In some embodiments, a PDI in accordance with the present teachings has a nominal (undeformed) diameter in the range of 17 Fr (5.7 mm) to 18 Fr (6 mm).

The balance of this disclosure pertains to the design of a catheter blood pump suitable for incorporating PDI 120. It is within the capabilities of those skilled in art, in conjunction with this disclosure, to determine the suitability of the use of a PDI, as described within, for use with other catheter blood pumps.

Overview of catheter blood pump incorporating Partially Deformable Impeller 120. The salient elements of an embodiment of a catheter blood pump incorporating a PDI include a sheath, an expandable impeller housing, and the PDI. In the illustrative embodiment, a drive cable, which is operatively coupled to an extracorporeal motor, conveys torque that drives the rotation of the PDI.

In some embodiments, the sheath and the expandable impeller housing of the catheter blood pump are movable—axially displaceable—independently of one another. This enables the relative axial positions of the sheath, expandable impeller housing, and the PDI to be alterable with respect to one another, allowing the catheter blood pump to attain different states or configurations. These different states facilitate various phases of use: insertion of the pump into the vasculature and advancement to the pumping site, pumping operations, and removal of the pump from the patient.

In the illustrative embodiment, the catheter blood pump is physically adapted to achieve two main configurations/states, including:

a first configuration/state for insertion into a peripheral artery (e.g., femoral, etc.) and advancement towards the heart, or removal therefrom. In this first configuration, the expandable impeller housing, but not the PDI, is situated within the sheath.

A second configuration/state, which is an operational state, wherein the expandable impeller housing is free from the confines of the sheath, and the PDI is sited within the proximal end of the expandable impeller housing.

In attaining the aforementioned configurations/states, the catheter blood pump may adopt certain intermediate states to transition between the first and second states referenced above.

In the illustrative embodiment, the respective axial locations of the sheath and expandable impeller housing are alterable by user interaction, which occurs near the proximal end of the catheter blood pump. This interaction is accomplished via an actuation system, which in the illustrative embodiment includes two slidable members that are disposed in an extracorporeal handle. One slidable member couples to the sheath and the other slidable member couples to expandable impeller housing. Sliding one of these members along the handle causes the sheath to retract or advance; sliding the other member causes the expandable impeller housing to retract or advance.

Embodiments of the invention provide a catheter blood pump wherein the diameter of the PDI, rather than that of any structure that surrounds it (e.g., impeller housing, sheath, etc.), is the feature that bumps up against the limit imposed by the diameter of the vasculature. In such embodiments, the undeformed diameter of the PDI is at least as large as the outer diameter of any other feature of the catheter blood pump that enters the body.

To the extent that the blades of the PDI contact a patient's anatomy due to a relative narrowing in the vasculature, any trauma that might otherwise be caused is expected to be minimized by virtue of the partial deformability of the impeller blades.

Because the PDI is minimally deformable relative to the expandable impellers of the prior art, it can be designed with a greater focus on hemodynamic and pumping-efficiency considerations than such prior art. Additionally, the PDI has a relatively large size (c.a., undeformed blade-circle diameter in the range of about 14 Fr to about 18 Fr) compared to most fixed-diameter impellers. Consequently, a PDI in accordance with the present teachings can be rotated at a relatively lower rotational speed for generating a given amount of pump flow than fixed-diameter impellers used in existing catheter blood pumps. This decreased rotational speed results in reduced shear stress, and, hence, decreased hemolysis of the patient's blood.

Details of Catheter Blood Pump design. In the illustrative embodiment, the catheter blood pump is a percutaneous device. That is, a portion of the catheter blood pump remains outside of a patient's body (extracorporeal) and a portion is inserted into the patient (in-vivo) and advanced to the heart or proximate thereto. In particular, and among other elements, the blood pump's PDI and impeller housing are inserted into the patient. For convenience, the phrase "pump assembly" is used herein to refer to the PDI, the impeller housing, and other distal features of the catheter blood pump.

There are several potential placement locations for the pump assembly. Most preferred for the illustrative embodiment of the catheter blood pump is across the aortic valve. Other potential locations include the ascending aorta or within the left ventricle. Such locations will require additional features, such as a "snorkel" for crossing the aortic valve. The pump assembly can be sited in other less-preferred locations, such as, without limitation, in the descending aorta, in suitably-sized peripheral blood vessels, or even in the right side of the heart or in right-side-related vasculature. At such alternate locations, one or more modifications are required to the illustrative embodiment, which, in conjunction with the present disclosure, are within the capabilities of those skilled in the art. For example, if sited in the right-side-of-the-heart or in right-side-related vasculature, modifications would be required to the impeller design, impeller rotation direction, as well as other features.

Figure 6:
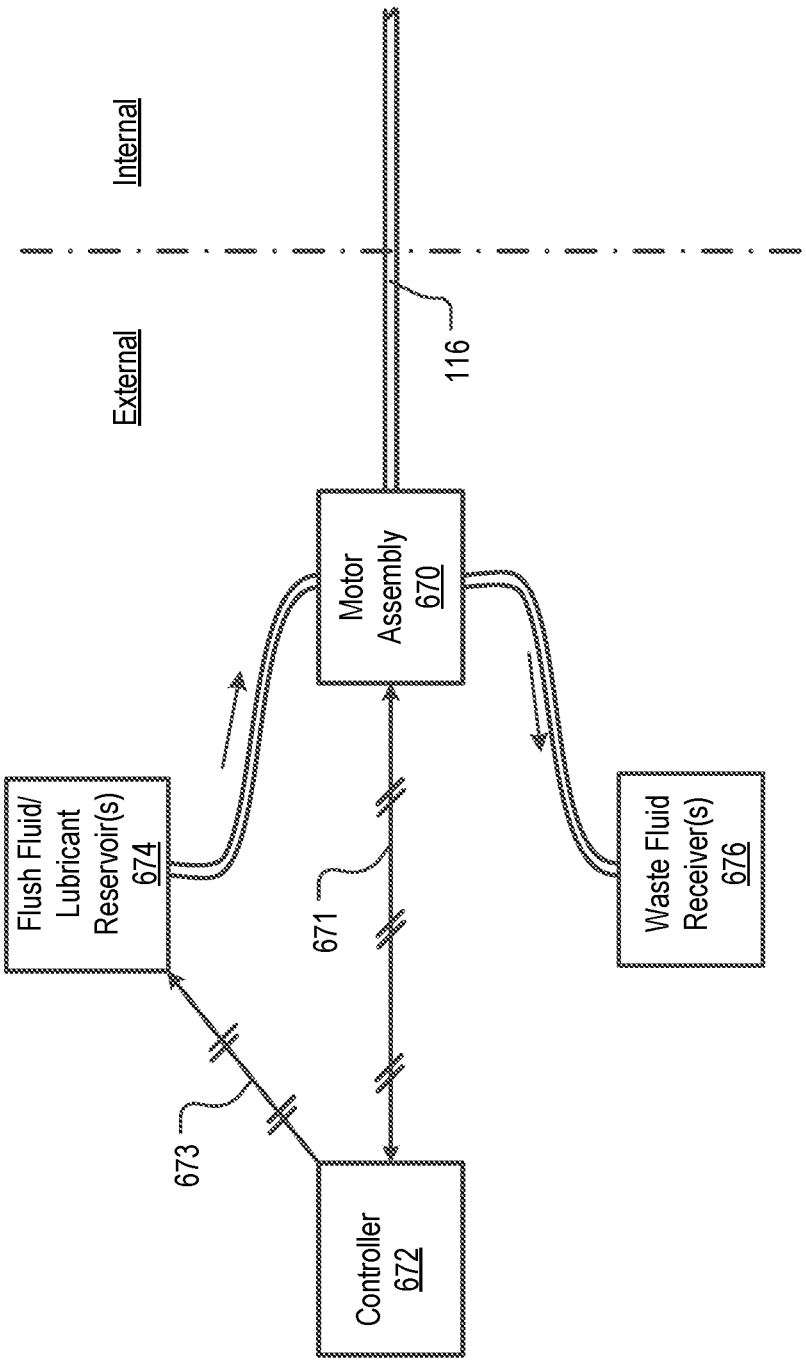
FIG. 6 depicts extracorporeal features of the catheter blood pump of FIG. 1A.

FIG. 6 depicts the extracorporeal elements of a catheter blood pump in accordance with an embodiment of the present invention, including motor assembly 670, controller 672, flush-fluid/lubricant reservoir(s) 674, and waste-fluid receiver(s) 676.

In some embodiments, motor assembly 670 includes a motor, an interface between drive cable 116 and the drive motor (e.g., fluid seals, etc.), fluidic connectors and a manifold for introducing fluids (for flushing, lubrication, etc.) to portions of the catheter blood pump (e.g., bearing surfaces, drive cable, etc.), power and signal connectors, sensor interfaces, and a housing to contain all such elements.

The motor of motor assembly 670 drives the pump assembly, and is capable of operating in a range of about 5,000 rpm to about 50,000 rpm. In some embodiments, the motor is a brushless DC servomotor with speed detection and regulation. The motor is suitable for driving the pump assembly to provide an average pump flow of 2.5 or more liters per minute at 60 mm Hg average pressure differential across the pump at a fluid viscosity of about 4 cP at 37° C. It will be understood that the specific power output requirement of the motor will be dependent on impeller design (i.e., pump efficiency) and the diameter of the delivery system, among other factors. Those skilled in the art will know how to specify a motor as a function of system design and performance requirements.

In some embodiments, such as disclosed later in this specification in conjunction with FIGS. 4A and 4B, motor assembly 670 is in the form of a handle, and, in addition to the aforementioned functionality, includes functionality for altering the configuration of the catheter blood pump.

Controller 672 is electrically connected to motor assembly 670 via signal line 671 and, in the illustrative embodiment, is also electrically connected to flush-fluid/lubricant reservoir(s) 674, such as by signal line 673. In the illustrative embodiment, controller 672 includes a power supply, motor-controller electronics, sensor electronics, and a display. Controller 672 typically provides one or more of the following functions, in addition to any others:

electrical drive (power) for the motor;
control signals for the motor;
controls the release of flush fluid/lubrication from reservoir(s);
receives and processes sensor data (e.g., blood pressure readings, etc.);
monitors system performance;
displays impeller speed and pump flow; and
provides auditory and/or visual alerts.

Flush-fluid/lubricant reservoir(s) 674 contains one (or more fluids) that are conveyed to motor assembly 670 and from it through tubing to bearing surfaces and the drive cable for flushing wear debris and/or providing lubrication. As previously noted, in some embodiments, controller 672 controls delivery of fluids from reservoir(s) 674. A variety of flush fluid and lubricants are suitable for use in conjunction with the catheter blood pump, including saline, glucose, or various commercially available solutions, as known to those skilled in the art, including, without limitation, a heparin/D5W solution. Waste lubricant and/or flushing fluid is conveyed back to motor assembly 670 from tubing and then expelled to waste fluid receiver(s) 676.

In the illustrative embodiment, drive cable 116, as well other tubing forming part of the catheter described later herein but not depicted in FIG. 6, is coupled to motor assembly 670. In various embodiments, some of such other tubing is fluidically coupled to flush-fluid/lubricant reservoir(s) 674 via a manifold or other fluid distribution arrangement within motor assembly 670. In the illustrative embodiment, drive cable 116 is operatively coupled to the motor to receive torque therefrom and transfer it, ultimately, to PDI 120 disposed near the distal end of the catheter blood pump. Drive cable 116, the aforementioned tubing, as well as other distally located features of the catheter blood pump are inserted into and pass through a patient's vasculature in preparation for pumping operations. In some other embodiments, the motor is part of the in-vivo portion of the catheter blood pump such that a drive cable is not required. In such embodiments, the motor's drive shaft couples, more or less directly, to the drive shaft of PDI 120.

Referring now to FIG. 1A, the distal portion of catheter blood pump 100 in accordance with the present invention is depicted. The salient elements depicted in FIG. 1A include sheath 102, impeller housing 104, bearing 108, outer tube 112, inner tube 114, drive cable 116, and partially deformable impeller 120, configured as shown. As depicted in FIG. 1A, catheter blood pump 100 is in a configuration suitable for insertion into, and movement through, a patient's vascular system.

In the illustrative embodiment, sheath 102 extends, at its proximal end, from motor assembly 670 (see FIG. 6), to a distal end, such that its length is sufficient to reach the heart after insertion into a peripheral vessel. The required length of the sheath will vary as between children and adults, males and females, and as between large and small adults; typically, the length of the sheath, including a portion that remains extracorporeal, is in a range of about 1 to about 2 meters.

Sheath 102 has the largest diameter of any of the fixed-diameter tubes of catheter blood pump 100 that are inserted into the vasculature. The undeformed diameter of PDI 120 is at least as great as the outer diameter of sheath 102. The sheath will typically have a diameter in the range of about 9 to about 16 Fr.

Figure 1B:
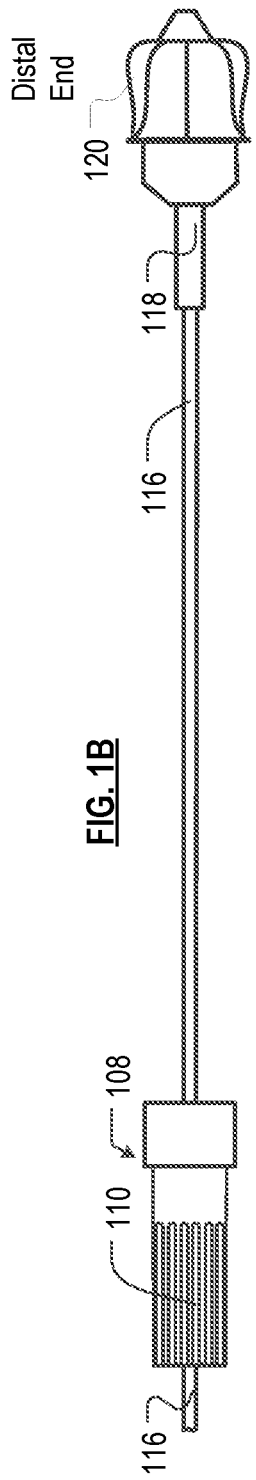
FIG. 1B depicts the distal portion of the catheter blood pump of FIG. 1A with certain features omitted for clarity.

With continuing reference to FIG. 1A, and referring also to FIG. 1B, drive cable 116 extends essentially the full length of catheter blood pump 100, from motor assembly 670 (see FIG. 6) to PDI 120. Drive cable 116 transmits torque from the drive motor to PDI 120, causing the impeller to rotate at high speeds. Drive cable 116 couples to the PDI at impeller drive shaft 118. The drive cable must be flexible to advance PDI 120 to its operational location in or proximate to the heart. In some embodiments, drive cable 116 comprises a multi-layer coil of wires, such as described in U.S. Pat. No. 9,962,475, incorporated by reference herein. The drive cable has a diameter in the range of about 0.05 to about 0.1 millimeters (mm) (about 0.002 to about 0.004 inches).

As configured for insertion into a patient, passage through the vascular system, and removal from the patient, PDI 120 is the distal-most major feature of catheter blood pump 100.

Impeller drive shaft 118, which extends from PDI 120, couples to drive cable 116. Since drive cable 116 is flexible, drive shaft 118 is rigid to provide, along with bearing 108, stability to rotating PDI 120 to keep it on center (within impeller housing 104). Drive shaft 118 comprises stainless steel tubing, such as hypo tube, or another rigid, medically-suitable material. In some embodiments, PDI 120 is over molded onto a hypo tube.

Bearing (i.e., sleeve bearing) 108 accepts drive cable 116. The bearing is made from an abrasion-resistant material having lubricity properties, since its inner surface abuts drive cable 116, which, during operation, may be rotating at speeds in excess of 5,000 rpm. In some embodiments, bearing 108 comprises polyether ether ketone (PEEK), polyethylene terephthalate (PET), polytetrafluoroethylene (PTFE), or the like. In some embodiments, most of the inner surface of bearing 108 comprises low-friction surface 109 (see FIG. 1D), which expands the choice of materials for other portions of the bearing.

Figure 1C:
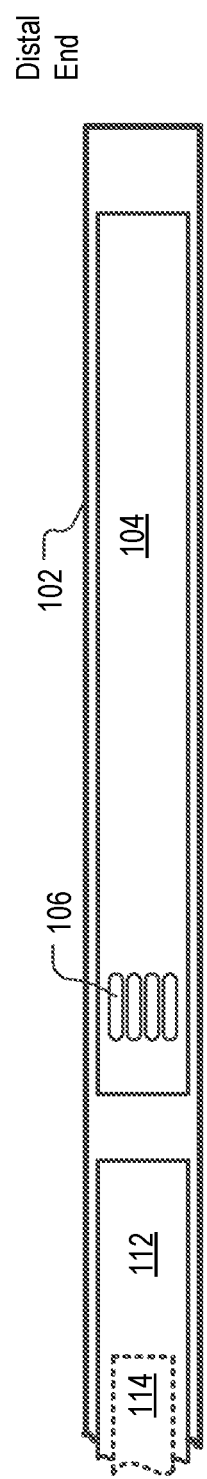
FIG. 1C depicts the features of the catheter blood pump of FIG. 1A that are omitted from FIG. 1B.

With continuing reference to FIGS. 1A and 1B, and referring now to FIG. 1C, impeller housing 104 is disposed within sheath 102 at a location distal to bearing 108. The proximal end of impeller housing 104 is attached to the distal end of bearing 108. Impeller housing 104 is expandable; it is constrained to a relatively smaller diameter while within sheath 102, and is free to expand to a relatively larger diameter when unconstrained by the sheath. The size of a gap between PDI 120 and the impeller housing 104, when the latter is expanded, is an important design consideration as it influences pump performance. Gap size can be determined, for example, via computational fluid dynamics, and is within the capabilities of those skilled in the art. This gap is typically in the range of about 0.025 to about 0.127 mm (about 0.001 to about 0.005 inches). The length (i.e., axial direction) of impeller housing 104 is typically in the range of 75 to about 102 mm (about 3 to about 4 inches).

In the illustrative embodiment, impeller housing 104 includes a plurality of openings 106 sited nearest its proximal end. As described later herein, openings 106 allow blood that is drawn in through the distal end of the impeller housing by action of fixed-diameter impeller 116 to flow out of the impeller housing. Based on its positioning within, for example, the left ventricle of the heart, this enables the pump to deliver blood across the aortic valve to the ascending aorta.

In some embodiments, impeller housing 104 is made from a Nitinol, laser-cut tubing, or braided Nitinol wire. In some embodiments, the impeller housing is covered with a thin membrane; for example, polyethylene terephthalate (PET) material braided into nitinol wire and then heat bonded together.

Figure 1D:
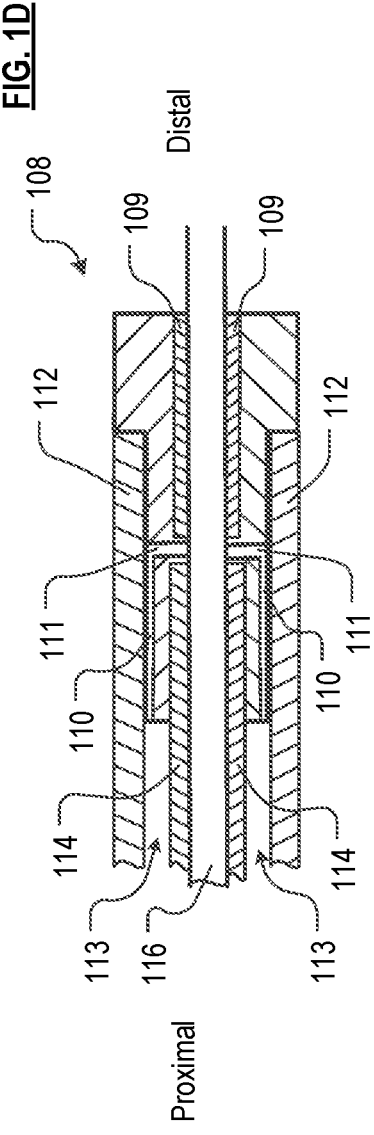
FIG. 1D depicts details of a bearing and associated features of the catheter blood pump of FIG. 1A.

Referring additionally to FIG. 1D, outer tube 112 and inner tube 114 couple to bearing 108 at their respective distal ends. In the illustrative embodiment, respective proximal ends of these tubes extend to motor assembly 670/handle 422 (see FIGS. 4A, 4B). In some embodiments, inner tube 114 comprises a medically suitable grade of PEBAX and in some embodiments is lined with PEEK or polytetrafluoroethylene (PTFE)-lined composite tubing. In some embodiments, inner tube 114 is made from multi-durometer tubing to enable bending at specified locations (as dictated by the anatomy). In some embodiments, outer tube 112 is not lined, but is likewise made of a medically suitable grade of PEBAX. Like inner tube 114, in some embodiments, outer tube 112 is made from multi-durometer tubing to enable bending at specified locations. Outer tube 112 has a diameter in the range of about 2.5 to about 3.6 mm (about 0.100 to about 0.140 inches) and inner tube 114 has a diameter in the range of about 1.5 to about 2.3 mm (about 0.06 to about 0.09 inches).

The inner and outer tubes are spaced apart by annular gap 113. The annular gap receives fresh flush fluid/lubricant delivered from flush fluid/lubricant reservoir(s) 674 (see FIG. 6). The external surface of the proximal portion of bearing 108 includes a plurality of surface grooves 110. These grooves receive the fresh flush fluid/lubricant flowing from annular gap 113. The distal end of at least two of surface grooves 110 includes through holes 111, which extend from the surface of associated grooves 110 to the inner surface of bearing 108 (adjacent to drive cable 116). The fresh flush fluid/lubricant flows through the holes and flows onto drive cable 116. The fresh flush fluid/lubricant is under pressure and flows to the proximal end of drive cable 116, carrying any debris generated from rotation of the drive cable, etc., back to motor assembly 670, at which location it is drained to waste fluid receiver(s) 676. The gap between drive cable 116 and inner tube 114 is in the range of about 0.05 to about 0.08 mm (about 0.002 to about 0.003 inches).

Figure 2A:
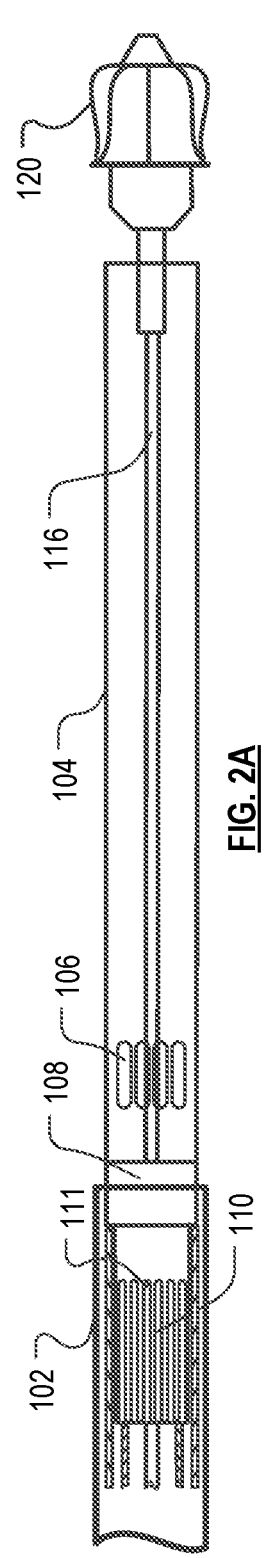
FIG. 2A depicts a first configuration of the distal portion of the catheter blood pump of FIG. 1A.
Figure 2B:
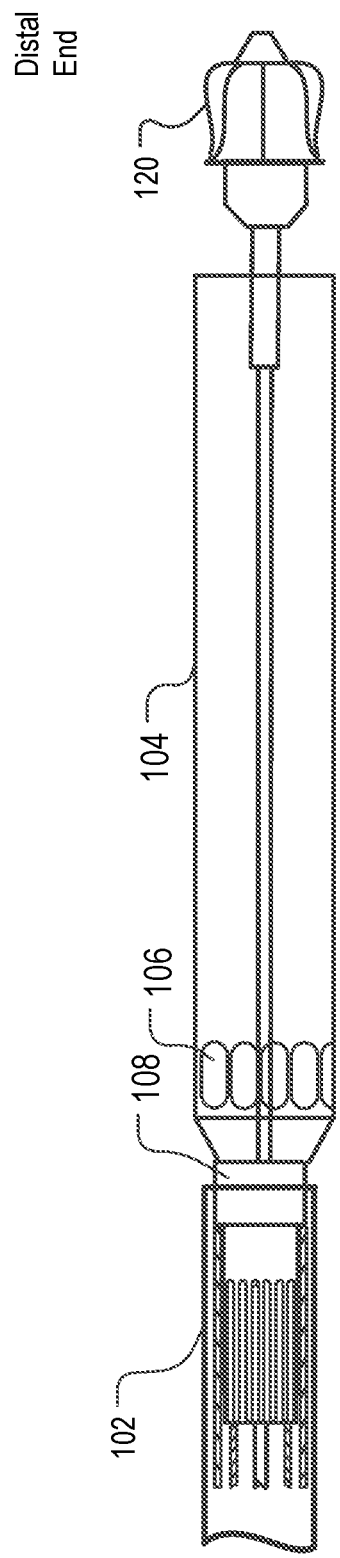
FIG. 2B depicts a transitional configuration of the distal portion of the catheter blood pump of FIG. 1A.

FIGS. 2A and 2B depict the distal end of catheter blood pump 100; FIG. 2A depicts impeller housing 104 in a compressed state whereas FIG. 2B depicts impeller housing 104 in an expanded state. In both of these figures, sheath 102 is partially retracted back to bearing 108, enabling impeller housing 104 to expand. In this regard, the configuration depicted in FIG. 2A must be considered a transitory state or configuration, since the impeller housing will expand essentially immediately once unconstrained by the sheath.

It is notable that when impeller housing 104 is compressed, as depicted in FIG. 2A, its outer diameter is less than that of PDI 120. When, however, impeller housing 104 is expanded, as depicted in FIG. 2B, its inner diameter is greater than that of PDI 120.

Figure 2C:
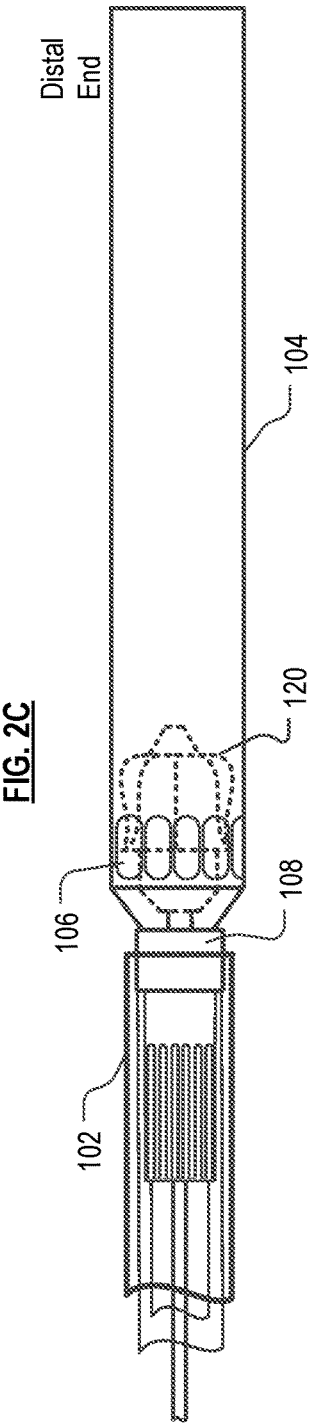
FIG. 2C depicts a second configuration of the distal portion of the catheter blood pump of FIG. 1A.

The configuration depicted in FIG. 2B is not the operational (i.e., pumping) configuration; rather, that configuration is depicted in FIG. 2C. As depicted in FIG. 2C, the configuration of catheter blood pump 100 is altered such that PDI 120 is now disposed within impeller housing 104. Specifically, PDI 120 is disposed at the proximal end of impeller housing 104. When catheter blood pump is operating, the rapidly rotating PDI 120 draws in blood through the distal end of impeller housing and expels it through openings 106.

FIG. 4A depicts handle 422, which is an embodiment of motor assembly 670 (FIG. 6). Handle 422 includes housing 424, having proximal opening 438, and slots 434 and 436. Housing 424 contains motor 442, manifold 444, distal slideable member 426 and proximal slideable member 430.

Sheath 102, which enters housing 424 through distal opening 438, physically couples to distal slideable member 426. Outer tube 112 and inner tube 114 (not depicted) pass through distal slideable member 426 and physically couple to proximal slideable member 430. Slideable members 426 and 430 include respective finger pads 428 and 432 that are accessible to a clinician via respective slots 434 and 436. Sliding slideable member 426 proximally (toward slideable member 430) causes sheath 102 to retract by a like distance. Sliding slideable member 430 distally (toward slideable member 426) causes impeller housing 104 to advance a like distance (recalling that via the coupling of the inner and outer tubes 112 and 114 to bearing 108, and impeller housing 104 to bearing 108, the impeller housing moves with the inner and outer tubes). As discussed further in conjunction with FIGS. 5A through 5E, the slideable members are manipulated to reconfigure catheter blood pump 100. Stop 440 limits travel in the proximal direction of slideable member 430.

Drive cable 116 is operatively coupled to motor 442, and passes through manifold 444 and slideable members 430 and 426, exiting through distal opening 438. Hypo tube 446 surrounds drive cable 116 near motor 442, extends from the manifold, and passes through proximal slideable member 430. In some embodiments, hypo tube 446 terminates near to the proximal end of slideable member 426, since it serves as a rail or guide along which slideable member 430 slides. Slideable member 426 slides along the outer tube 112.

FIG. 4B depicts an enlargement of the encircled region in FIG. 4A. This figure depicts an embodiment of the internal structure of slideable member 430, and depicts the flow of flush fluid/lubricant into and out of catheter blood pump 100.

Fluid inlet port 454 in housing 424 is fluidically coupled to inlet 452 of slideable member 430 via conduit 456. Fluid inlet port 454 receives flush fluid/lubricant from reservoir(s) 654. Conduit 456 delivers such fluids to inlet 452, which feeds annular cavity 450. Annular cavity 450 surrounds outer tube 112 in slideable member 430. Openings in outer tube 112 enable fluid to flow, under pressure, into the gap between the outer tube and inner tube 114. As previously discussed, the fluid travels between these two tubes until reaching bearing 108, at which point the fluid passes through holes 111 in the bearing (see, e.g., FIG. 1D), thereby wetting drive cable 116.

Waste fluids (i.e., flush fluid/lubricant contaminated by debris, etc.) flow towards the proximal end of drive cable 116 under pressure, and are removed at fluid outlet port 464 of housing 424, which is fluidically coupled to waste fluid receiver(s) 676. More particularly, waste fluids are withdrawn from drive cable 116 at manifold 444. Seals 457 prevent fluids that flow from drive cable 116 to motor shaft 443 from entering motor 442. Port 462 of manifold 444 and port 460 of motor housing 458 are fluidically coupled to fluid outlet port 464 by respective conduits 468 and 466. The waste fluid thus flows through these conduits and the fluid outlet port to the waste fluid receiver(s).

Conduit 456 is of sufficient length to accommodate forward movement of slideable member 430, as described in conjunction with FIGS. 4A, and in more detail with respect to FIGS. 5A-5E.

Figure 3:
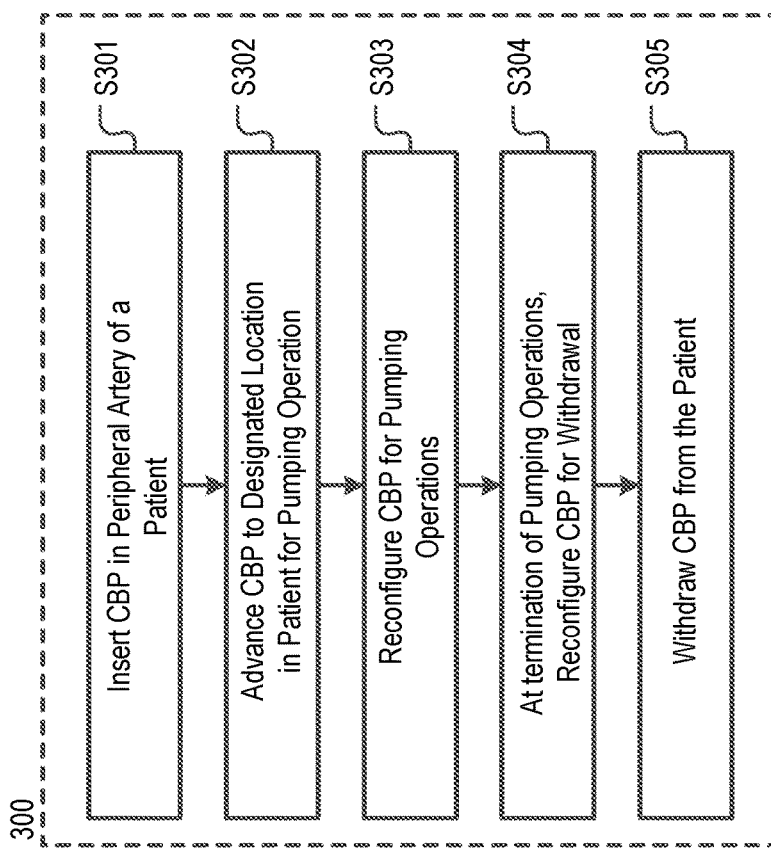
FIG. 3 depicts a method for using a catheter blood pump in accordance with the illustrative embodiment of the invention.

FIG. 3 depicts method 300 for operating catheter blood pump 100. In accordance with operation S301, the catheter blood pump is inserted into a peripheral artery of a patient, typically the femoral artery. This is routinely performed in the cath-lab, via a procedure commonly known as the Seldinger technique. Once inserted, the distal end of the catheter blood pump is advanced through the vasculature to the desired site as per operation S302, which is typically the across the aortic valve. For operations S301 and S302, catheter blood pump 100 is in the configuration depicted in FIG. 5A. In this configuration, impeller housing 104, but not PDI 120, is situated within sheath 102. In the illustrative embodiment, this configuration is achieved by having slideable member 430, which controls movement of impeller housing 104, in a retracted or proximal position, and slideable member 426, which controls movement of sheath 102, in an advanced or distal position.

Figure 5A:
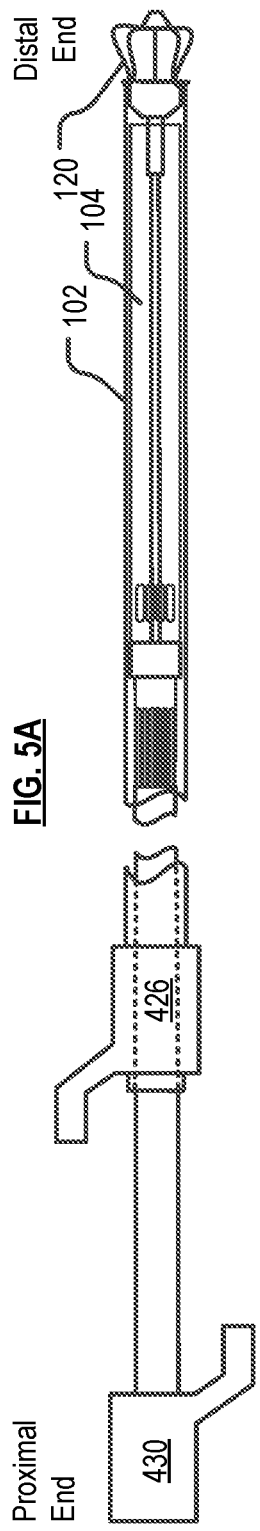
FIG. 5A depicts the proximal and distal ends of catheter blood pump of FIG. 1A, as configured for introduction to the vascular system.
Figure 5B:
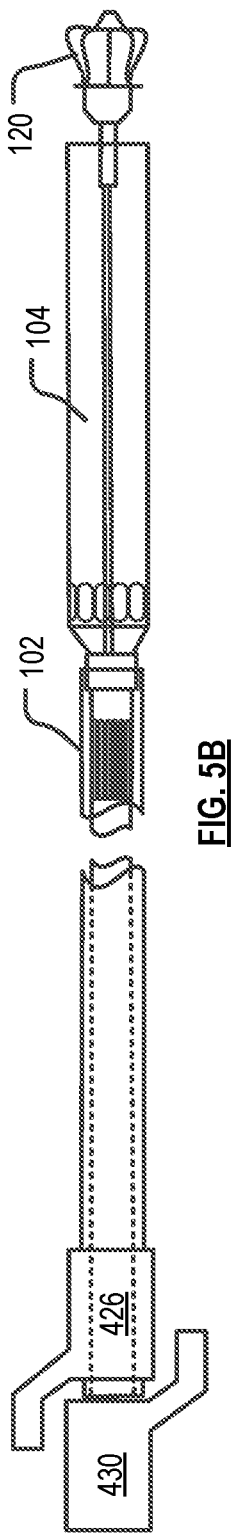
FIG. 5B depicts the proximal and distal ends of catheter blood pump of FIG. 1A in an intermediate configuration, as it is being reconfigured for pumping operations.
Figure 5C:
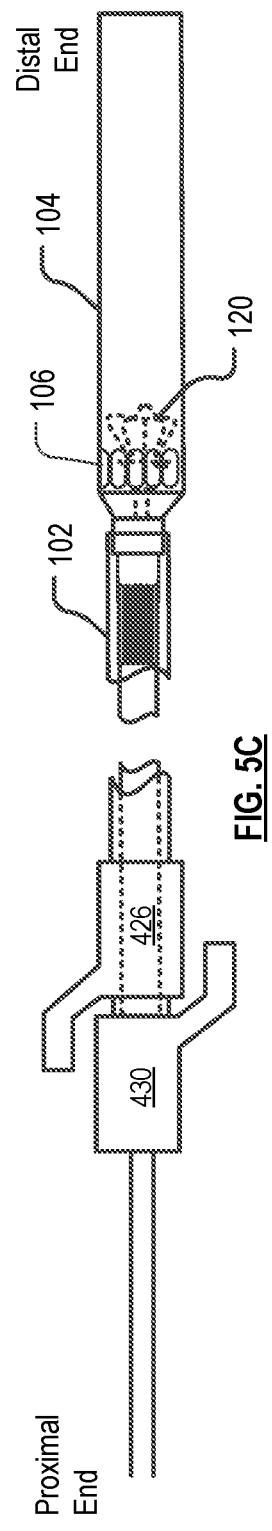
FIG. 5C depicts the proximal and distal ends of catheter blood pump of FIG. 1A, as configured for pumping operations.

In operation S303, catheter blood pump 100 is reconfigured for pumping operations. In the illustrative embodiment, this is a two-step process. In a first step, as depicted in FIG. 5B, slideable member 426 is retracted (moved proximally) against slideable member 430. This causes sheath 102 to retract, freeing impeller housing 104 and thereby allowing it to expand. At the end of this first step, PDI 120 is still the distal-most portion of catheter blood pump 100, and is exposed to the anatomy. In a second step, which is depicted in FIG. 5C, slideable member 430 is advanced (moved distally), advancing slideable member 426 with it. This causes both sheath 102 and impeller housing 104 to advance, such that PDI 120 is captured within the impeller housing, near the proximal end thereof. Note that in this operation, the impeller housing and the sheath do not move relative to one another; they move distally in concert. Protected from the anatomy by expanded impeller housing 104, pumping operations may begin.

During pumping operations (if the impeller housing is sited across the aortic valve), blood enters the distal end of impeller housing 104 from the left ventricle of the heart. The blood crosses the aortic valve through the impeller housing and is discharged through openings 106 into the ascending aorta.

At the termination of pumping operations, which will typically last for several hours to one or more weeks, catheter blood pump 100 is once again reconfigured, this time for removal from the vasculature. As before, reconfiguration involves two steps. In a first step depicted in FIG. 5D, slideable member 426 is retracted (moved proximally), retracting slideable member 430 with it. This retracts both sheath 102 and impeller housing 104 (no relative motion therebetween), with the result that PDI 120 no longer remains in the impeller housing. This places catheter blood pump 100 in the same configuration as in FIG. 5B. And in a second step, which is depicted in FIG. 5E, slideable member 426 is advanced (moved distally), which advances sheath 102 over impeller housing 104, causing the impeller housing to contract in diameter as it does so. Catheter blood pump is now configured for withdrawal, and has the same configuration as depicted in FIG. 5A for insertion.

It will be appreciated by those skilled in the art that there a variety of ways to create relative movement between the sheath, expandable housing, and drive cable to achieve the two basic configurations (i.e., (i) insertion/withdrawal and (ii) operation) for the catheter blood pump, as discussed below.

In the illustrative embodiment, sheath 102 and impeller housing 104 are independently moved while drive cable 116/PDI 120 remain in a fixed axial location. In a first alternative embodiment, sheath 102 and the drive cable/PDI are independently moved while impeller housing 104 remains in a fixed axial location. In such an embodiment, sheath 102 is retracted (i.e., moved proximally), thereby freeing impeller housing 104 to expand. Drive cable 116 is retracted (i.e., moved proximally), moving PDI 120 into the expanded impeller housing, readying the catheter blood pump for pumping operations. After pumping operations are complete, drive cable 116 is advanced (moved distally) so that PDI 120 exits the confines of impeller housing 104.

Sheath 102 is then advance (moved distally), which forces impeller housing 104 to contract in diameter, the impeller housing moving wholly within the sheath.

In a second alternative embodiment, only impeller housing 104 is movable; sheath 102 and drive cable/impeller remain in fixed axial locations. In this embodiment, impeller housing 104 is advanced (i.e., moved proximally), expanding as it moves beyond sheath 102, and continuing to advance until PDI 120 is in its desired operational location within the impeller housing and near its proximal end (i.e., proximate to openings 106).

In embodiments in which a drive cable is not used (i.e., internal motor), the motor and PDI 120 are moved, rather than the drive cable and PDI 120.

To the extent such alternative methods are used to reconfigure catheter blood pumps in accordance with the present teachings, modifications to handle 422 (FIG. 4A) may be required. Such modifications are within the capabilities of those skilled in the art.

Summarizing, the catheter blood pump, as depicted and previously described, comprises: (i) a PDI; (ii) a sheath; and (iii) an expandable impeller housing. The catheter blood pump may further comprise at least one of the following features, in any (non-conflicting) combination:

- a motor that delivers torque to the fixed-diameter impeller;
- a drive cable that is coupled to the fixed-diameter impeller for transmitting torque thereto;
- the diameter of the PDI is substantially equal to or greater than the outer diameter of the largest-diameter tube of the catheter blood pump that is inserted into the vascular system;
- the diameter of the PDI is larger than outer diameter of the sheath;
- the sheath has the largest external diameter of any of the plurality of fixed-diameter tubes of the blood pump that are inserted into the vasculature, wherein the PDI is too large to reside within the sheath;
- the PDI is disposed at the distal end of the blood pump and is the distal-most feature thereof as it is advanced through the vasculature;
- the impeller housing has two states, one in which it is compacted/compressed such that its diameter is reduced, and in which state it resides within the sheath, and a second in which it is external to the sheath, wherein the impeller housing expands to size suitable for positioning the PDI therein;
- the impeller housing includes a plurality of holes disposed proximate to the proximal end thereof, through which blood flows out of the impeller housing during operation of the catheter blood pump;
- the impeller housing includes an opening at a distal end thereof, wherein in operation, blood is drawn through the opening;
- the impeller housing is physically coupled to the distal side of a bearing;
- inner and outer tubes are physically coupled to the proximal side of the bearing, wherein flush fluid and/or lubricant flow(s) toward the bearing through a gap between the inner and outer tubes;
- a plurality holes disposed radially through the bearing to enable flush fluid and/or lubricant that flow(s) through the gap between the inner and outer tubes to pass through the bearing onto the drive cable;
- an actuator that is physically adapted to place the catheter blood pump in at least two physical configurations, one for insertion/removal/advancement through the vasculature and a second for pumping;
- an actuator that is physically adapted to cause relative movement in an axial direction among the sheath, the impeller housing, and the PDI;
- an actuator that is physically adapted to independently move, in an axial direction, the sheath and the impeller housing, but not move the PDI;
- an actuator that includes a first slideable member and a second slideable member, each independently movable in the axial direction, wherein the first slideable member physically couples to a proximal end of the sheath, and the second slideable member is operatively coupled to the impeller housing;
- an actuator that includes a first slideable member and a second slideable member, each independently movable in the axial direction, wherein the first slideable member is operatively coupled to the sheath, and the second slideable member is operatively coupled to the impeller housing, wherein three positions of the slideable members are required to place the catheter blood pump in two states, one for movement through the vascular system and the second for pumping operations;
- an actuator that includes at least a first slideable member, wherein the first slideable member is fluidically coupled to a source of flush fluid and/or lubricant;
- an actuator that includes a distal-most slideable member and a proximal-most slideable member, each independently movable in the axial direction, wherein the actuator includes a hypo tube that passes through the proximal-most slideable member along the axial direction to guide movement thereof;
- an actuator that includes a first slideable member and a second slideable member, each independently movable in the axial direction, wherein the first slideable member physically couples to a proximal end of the sheath, and the second slideable member is operatively coupled to the impeller housing, and wherein the actuator further includes a motor;
- an actuator that is physically adapted to independently move, in an axial direction, the sheath and the fixed-diameter impeller, but not move the impeller housing, to place the pump in the at least two physical configurations;
- an actuator that is physically adapted to move the impeller sheath in an axial direction, but not move the sheath and not move the PDI, to place the pump in the at least two physical configurations;
- an actuator that includes a single slideable member that is movable in the axial direction, wherein the first slideable member is operatively coupled to the impeller housing;
- proximal of a bearing that stabilizes the PDI during pumping operations, the catheter blood pump consists of the following tubes, in order of smallest diameter to largest diameter: an inner tube, an outer tube, and a sheath;
- an actuator that is physically adapted to independently move, in an axial direction, the sheath and the impeller housing, but not move the PDI, consists of the following tubes, in order of smallest diameter to largest diameter: a hypo tube, an inner tube, an outer tube, and a sheath;

It is to be understood that the disclosure describes a few embodiments and that many variations of the invention can easily be devised by those skilled in the art after reading this disclosure and that the scope of the present invention is to be determined by the following claims.

What is claimed:

1. A catheter blood pump including a portion that is adapted to be inserted into a patient's vascular system, the portion of the catheter blood pump that is adapted to be inserted into the patient's vascular system comprising:

a partially deformable impeller having a first undeformed diameter, the partially deformable impeller having at least two blades, wherein a periphery of each blade is deformable, the periphery being about 5 to about 20 percent of a width of the blade;

a sheath having an outer diameter, wherein, the partially deformable impeller is always external to the sheath and cannot fit within the sheath;

an impeller housing, wherein the impeller housing is expandable and contractible in diameter; and an actuator, wherein the actuator is operable to position the impeller housing outside the sheath with the impeller housing in an expanded-diameter state and with the catheter blood pump in a first state, and to position the impeller housing inside the sheath with the impeller housing in a contracted-diameter state and with the catheter blood pump in a second state, wherein:

a) in the first state, the catheter blood pump is configured for pumping operations, wherein (1 the impeller housing is in the expanded-diameter state, and (ii) the partially deformable impeller is disposed in the impeller housing; and b) in the second state, the portion of the catheter blood pump is configured for movement through the vascular system, wherein (i) the impeller housing is in the contracted-diameter state and is disposed within the sheath, and (ii) the at least two blades of the partially deformable impeller are exposed to environmental conditions whereby the at least two blades are not contained in any structure of the catheter blood pump.

2. The catheter blood pump of claim 1, wherein the partially deformable impeller is configured to cycle between a deformed state and an undeformed state, the undeformed state providing the partially deformable impeller with the first undeformed diameter, as the partially deformable impeller is advanced through the patient's vascular system.

* * * * *